United States Patent

[11] 3,563,148

[72] Inventor James J. Newman
Salem, Oreg.
[21] Appl. No. 734,274
[22] Filed June 4, 1968
[45] Patented Feb. 16, 1971
[73] Assignee LeFebure Corporation
Cedar Rapids, Iowa
By mesne assignments

[54] AUTOMATIC SEQUENCE CAMERA AND SYSTEM
14 Claims, 8 Drawing Figs.

[52] U.S. Cl. ................................................. 95/31
[51] Int. Cl. .......................................... G03b 19/04
[50] Field of Search .......................................... 352/121;
95/31, 31 (elec.), 11

[56] References Cited
UNITED STATES PATENTS

| 2,520,296 | 8/1950 | Williams | 352/121(X) |
|---|---|---|---|
| 3,098,418 | 7/1963 | Reiher | 95/31 |
| 3,135,181 | 6/1964 | Gevatter | 95/31(X) |
| 3,135,182 | 6/1964 | Hintze | 95/31 |
| 3,385,189 | 5/1968 | Hennig | 95/31(UX) |
| 3,451,322 | 6/1969 | Noda | 95/31 |
| 3,470,803 | 10/1969 | Fukuoka | 95/31 |

FOREIGN PATENTS 926,258  5/1963  Great Britain................  95/31

OTHER REFERENCES

Charles L. Hulcher-A Rapid Sequence 70mm Press Camera-from-Photographic Science & Technique Series II Vol. 2 No. 4 - Nov. 1955 p. 143-145

*Primary Examiner*—John M. Horan
*Assistant Examiner*—Russell E. Adams, Jr.
*Attorneys*—Haven E. Simmons and James C. Nemmers ABSTRACT: A remote controlled, sequence camera system for security purposes in banks and similar institutions, each camera featuring a self-contained power supply using a rechargeable battery, an extreme wide-angle lens with fixed focus and great depth of field, and a unique film drive system and circuitry incorporating unperforated roll film. One or more such cameras are connected into a single "digital readout panel" employing film counters, camera test circuits and a relay circuit which activates all cameras. The relay circuit may be connected into standard bank alarm systems and be activated in turn from one or more remote locations. Once activated, each camera continues to operate until shut off or until its film supply is exhausted. A trickle charger connected into the readout panel maintains the battery in each camera.

PATENTED FEB 16 1971

INVENTOR.
JAMES J. NEWMAN
BY
ATTORNEY

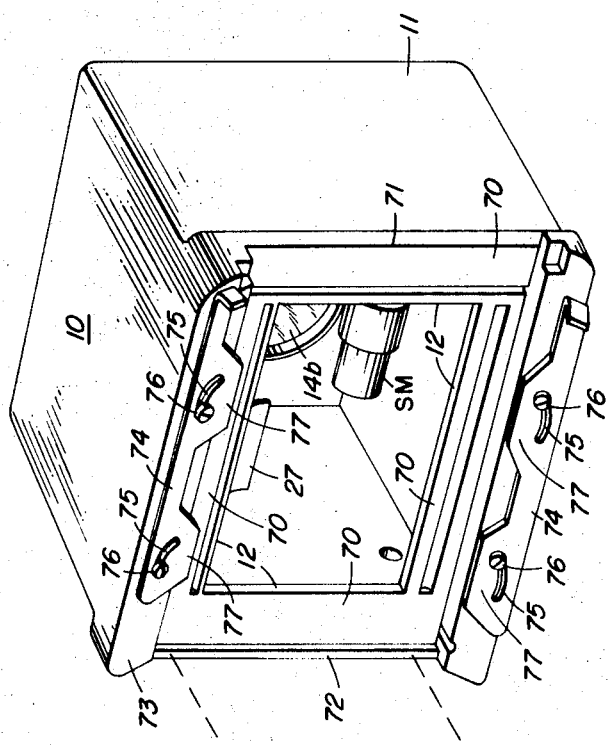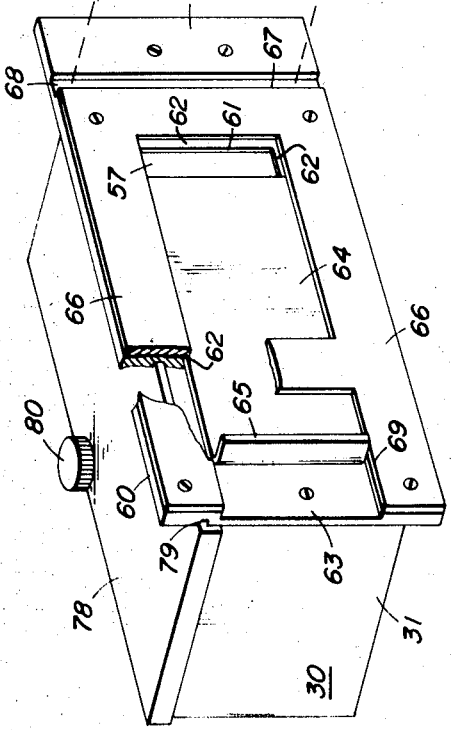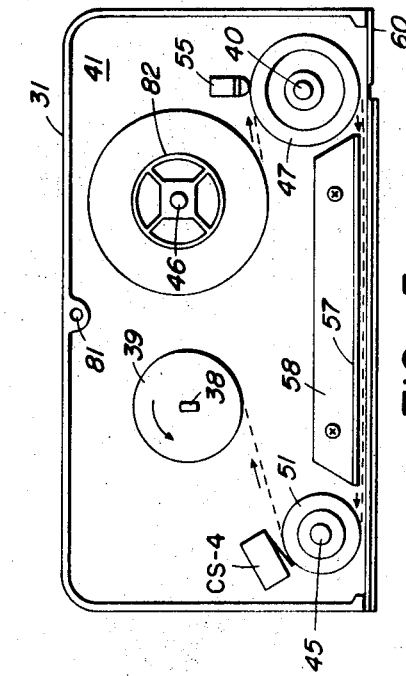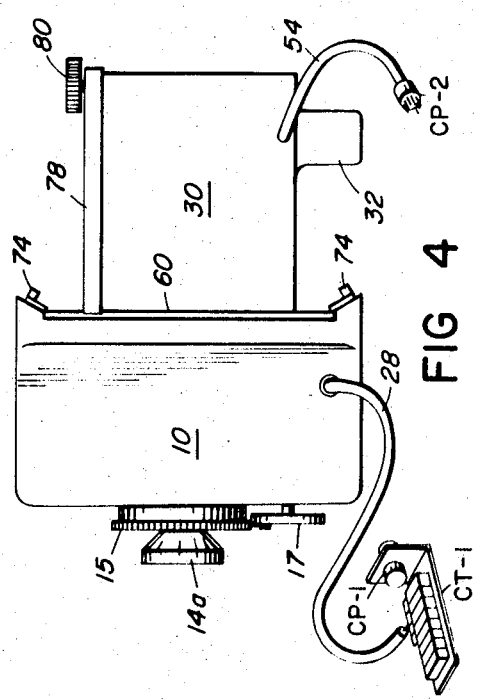

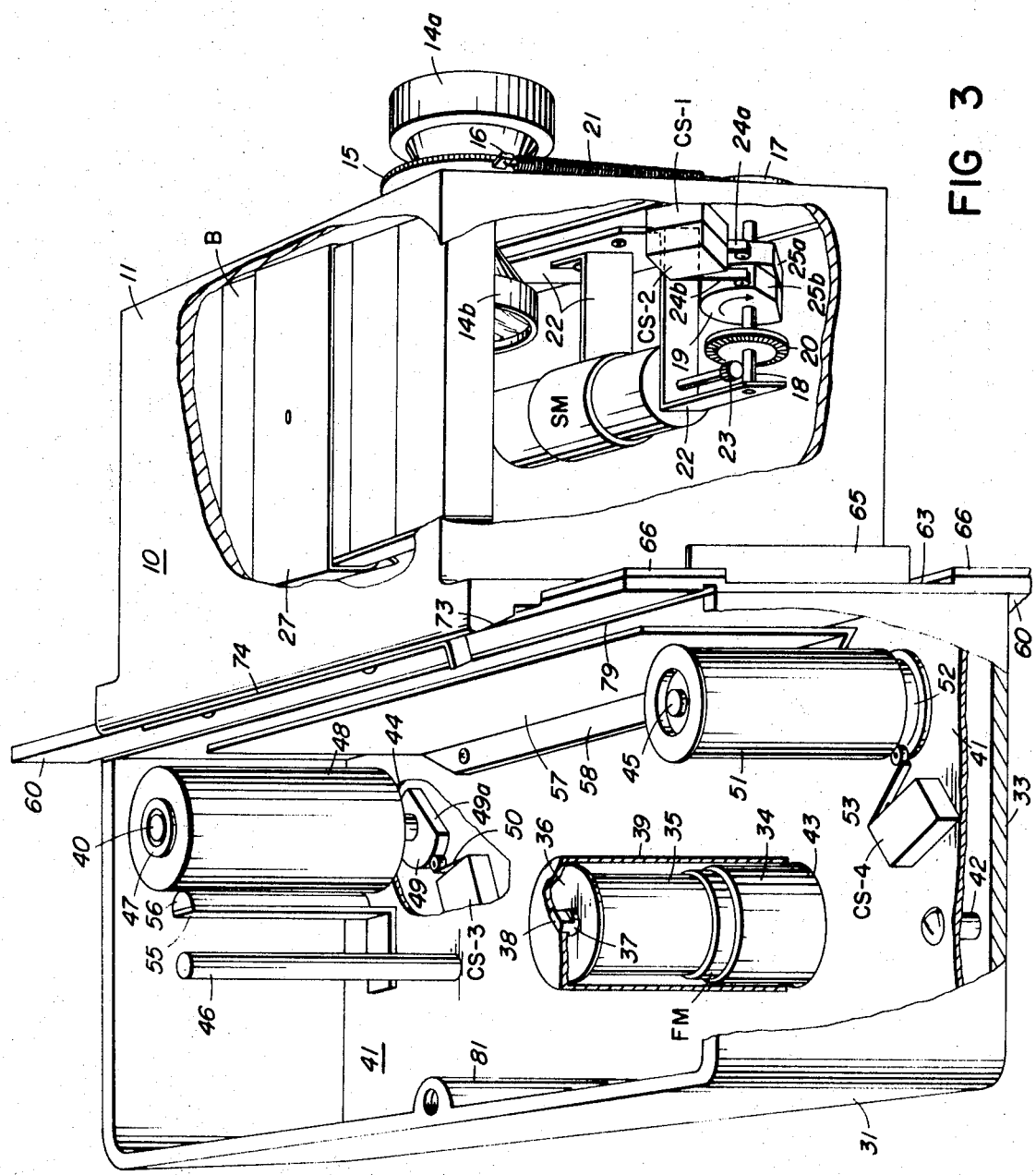

AUTOMATIC SEQUENCE CAMERA AND SYSTEM

BACKGROUND OF THE INVENTION

Current sequence cameras are deficient in a number of respects insofar as bank security purposes and the like are concerned. For example, means separate from the camera are often used or required in order to impart sequence operation, rather than being incorporated in the camera itself. A self-contained power supply is not employed for each camera, as a result of which failure or disablement of the bank's regular power will also disable all the cameras. The size of picture taken by each camera is relatively small because an extreme wide angle lens is not used; the depth of filed also tends to be relatively restricted. All such cameras typically utilize regular 110v. line power which requires conduit installation between the cameras and their control centers. Typically, too, an acetate base, perforated film, either 16 or 35 millimeter, is used which after sitting idle while wound on the film drive mechanism, tends to take on a "set." As a result, when a camera is activated, the film is apt to ride up and off the drive sprockets, causing the latter sometimes to tear out the drive perforations in the film. All these objections and deficiencies are overcome in the cameras and camera system of the present invention.

SUMMARY OF THE INVENTION

One or more sequence operated cameras are connected into a system by which all cameras may be operated from several remote locations for bank security and like purposes. Each camera employs a 100 foot roll of 70 millimeter wide, polyester base film, unperforated for drive purposes, and an extremely wide-angle, fixed focus lens, the lens coverage being 107° instead of the typical 56° of many other wide-angle lenses. A relatively large contact print can thus be made from each exposure. The film passes the lens horizontally so that a wide lateral field is encompassed owing to the wide-angle lens; hence lateral aim of the camera is not critical. The film is much thinner than acetate-based film so that a 100 foot roll requires less space. Nor does the polyester base film tend to take a "set" after long periods of idleness on the film rollers. Each camera basically comprises two portions. The first is a camera box incorporating the lens and a motor-driven shutter operating mechanism, which both trips and resets the shutter, together with a rechargeable 6v. battery. The latter permits the camera to be operated from its own power source rather than be dependent upon some outside power source. The second portion, which is removably attached to the first, is a film magazine incorporating a film drive motor, idler rollers and other mechanism. No drive sprockets are used or required. The film drive motor itself is concentric with the film takeup roll which in turn also incorporates a reduction gear box. Both camera portions incorporate various electrical controls, including several cam-operated microswitches, by which both motors are suitably activated in order to provide sequence operation of the camera as a whole. Two such switches are activated by the shutter mechanism and control operation of the shutter motor and initial operation of the film drive motor. Another pair of such switches controls the remainder of the operation of the film drive motor. The latter pair of switches in turn is controlled by one of the film idler rollers and together therewith meters the film required for each exposure, then terminates operation of the film drive motor and finally dynamically brakes the latter by establishing a short through its windings. Approximately, 235 exposures are possible from each 100 foot roll of film, each roughly 2½× 5 inches.

Each camera is attached by its own electrical cable into a single "digital readout panel" which includes, for each camera, a test button by which operation of that camera can be checked from time to time, and a film counter and counter light therefor. In addition, the panel carries an alarm relay which when closed activates all the cameras and which is controlled from one or more remote locations, such as a bank teller's installation, or is otherwise connected into the bank's regular alarm system. A trickle charger connected into the readout panel maintains a full charge on the battery in each camera through the cables attaching the same to the panel. These cables also permit the camera batteries to provide the power necessary in order to operate the various functions of the readout panel including the alarm relay. Hence, not only is each camera independent of any outside power source but so also is the readout panel, especially the alarm relay. Once the alarm relay is closed, all cameras continue to operate regardless until deactivated from the readout panel or until their film supply is exhausted, in the latter case a microswitch riding on the film breaking the circuit to the two motors in each camera.

BRIEF DESCRIPTION OF THE DRAWINGS

FIG. 2 is a partially exploded, isometric view of a camera according to the present invention separated into its two principal assemblies and d showing the mode by which the two are joined.

FIG. 3 is an upper isometric view of a camera according to the present invention with certain parts omitted and various portions broken away showing the principal mechanical details of the camera.

FIG. 4 is a side elevation of a camera according to the present invention.

FIG. 5 is a partial top plan view of the camera of FIG. 4 with the film magazine cover plate removed and showing the passage of the film through the camera.

Figure 1:
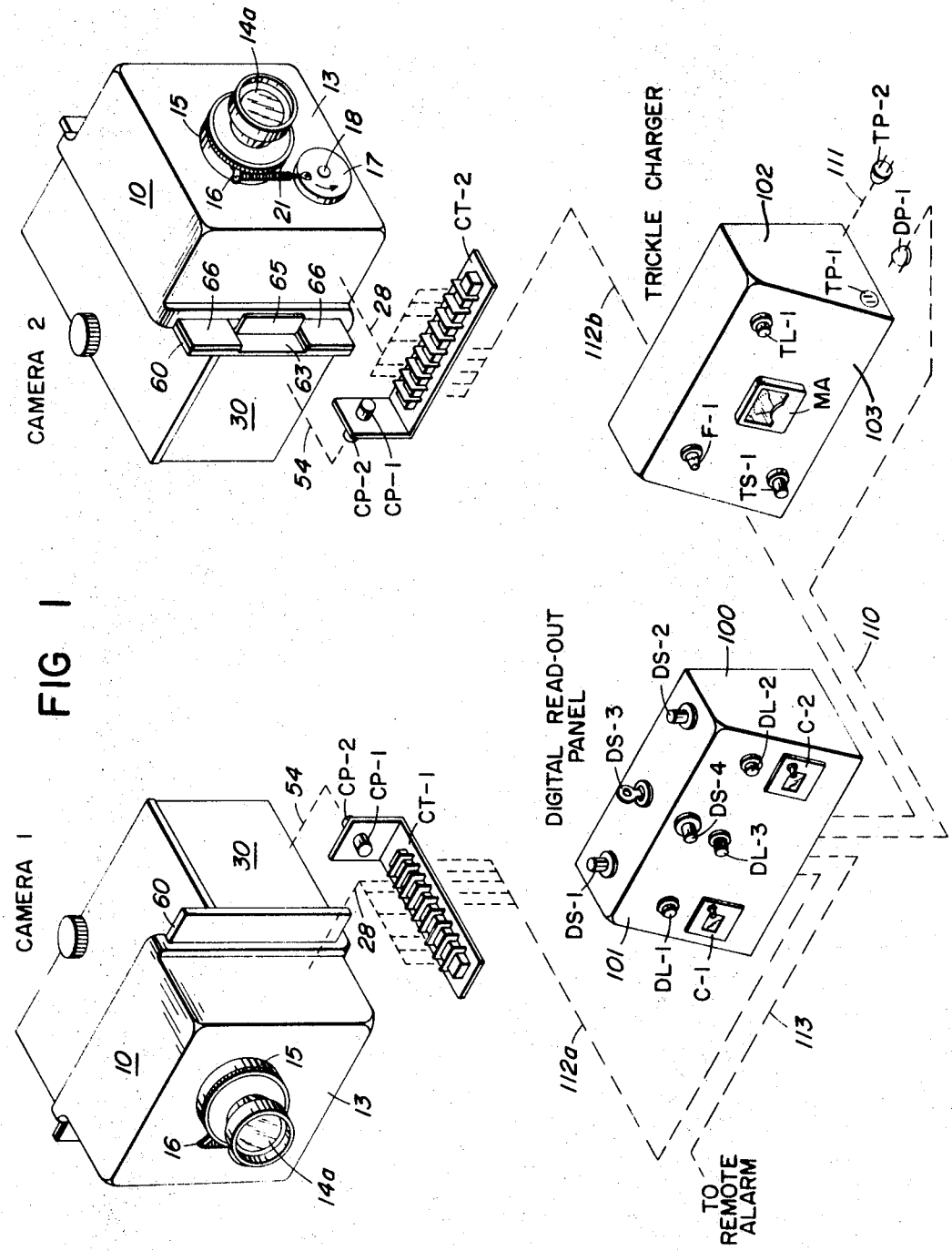
FIG. 1 illustrates a pair of cameras according to the invention together with a schematic showing of their connections into the digital readout and trickle charger.

DESCRIPTION OF THE PREFERRED EMBODIMENT a. The Camera

As mentioned, the camera proper comprises two portions, a camera body assembly and a film magazine assembly. The camera body assembly, generally designated at 10, includes a generally rectangular housing 11, which may be a suitable alloy casting, having an open rear face surrounded by integral inner flanges 12 and a front wall 13 in which is centrally mounted a fixed focus, extreme wide-angle lens 14. The lens used in the particular camera illustrated is a commercially available item of German origin, a "Schneider-Kreuznach, Super-Angulon, 1:8/65," comprising front and rear lens assemblies 14a and 14b between which is sandwiched a suitable leaf shutter assembly 15 having stops f:8 to f:32, speeds up to 1/125th of a second, and a shutter trip lever 16 extending from its periphery. A the f:8 setting, which is suitable for most installations, the depth of field of the foregoing lens is from 8 to 300 feet and its field is 107°. Adjacent one lower corner of the housing front wall 13 is disposed a pitman 17 fixed on a stub shaft 18 journaled in the front wall 13 and extending within the housing 11, its inner end having fixed thereto a cam 19 (to be later further described) and a face gear 20. A pitman arm 21 is pivotally attached to the exposed end of trip lever 16 and to the pitman 17, the pitman arm 21 being in the form of an extensible only helical spring. Rotation of pitman 17 will thereby move trip lever 16 in one direction to trip the shutter assembly 15 and then in the other direction to reset the same. Along the inner face of the front wall 13, below lens 14, is horizontally disposed a shutter motor SM incorporating a reduction gearbox (not shown) on a suitable bracket assembly 22 in which the inner end of shaft 18 is also journaled, the output shaft of the gearbox of SM carrying a small pinion gear 23 engaging the larger face gear 20. The speed of the output shaft of SM is about 4 revolutions per second, and SM itself is a small 6v. motor having a permanent magnet field and a wound armature. A suitable such motor is a model "Mini-Richard," obtainable from Max Luder of Gemmrighein, West Germany, and has a torque output of 480 c.m.p. Also supported by the bracket assembly 22 is a pair of s.p.d.t. microswitches CS–1 and CS–2 mounted side by side such that their switch-operating arms 24a and 24b, respectively, ride on the periphery of cam 19. The latter is provided with a flat 25a thereon upon which both arms 24a and 24b ride, the portion of the flat 25a upon which arm 24b only rides having an additional, angularly disposed flat 25b adjoined thereto. When the switch arms 24a and 24b of CS–1 and CS–2 are on the flat 25a, each is in the NC position shown in FIG. 6. A 6v., rechargeable, cadmium-nickel battery B is secured to the inner face of the front wall 13 above lens 14 by a suitable spring bracket 27, and a 7 lead electrical cable 28, connected into the electrical components of the camera body assembly 10 in the manner hereinafter described, extends through a sidewall of housing 11 to a combined female pin socket CP–1 and terminal board CT–1 having 8 pairs of terminals.

The film magazine assembly, generally designated at 30, also consists of a generally rectangular housing 31, which may also be an alloy casting but which is wider and shallower than the camera body assembly 11, having open top and front faces. A hollow boss 32 is cast integrally into the floor 33 of housing 31 somewhat toward a rear corner thereof and projects downwardly therefrom. A film drive motor FM is secured by several set screws within a mounting sleeve 34 also cast integrally in the floor 33 and projecting above the latter. Film drive motor FM is a 12v. unit, also having a permanent magnet field and a wound armature but operated at 6 vs. A suitable such motor is obtainable from Howard Motor Group, MSL Industries, Inc. Fort Lauderdale, Florida Model No. 1490M2. The upper end of FM incorporates a 20 to 1 ratio reduction gear box (not shown) within a hollow sleeve 35 which is closed by an end plate 36 in which is journaled the output shaft 37 of the gear box, the speed of shaft 37 being approximately one revolution per second. The exposed end of shaft 37 is provided with a pair of parallel flats in order to form a driving dog 38. The latter is received in a complimentary slot in the top wall of a film drive sleeve 39 which removably slips over the gear box sleeve 35 and end plate 36 and is closely concentric at its lower end with the outer surface of the motor-mounting sleeve 34. Thus, rotation of shaft 37 by film drive motor FM will rotate the film drive sleeve 39. Adjacent the diagonally opposite corner of floor 33 is fixed an upright stub axle 40, and a floor plate 41 is suitably fixed in spaced relation to the floor 33 of housing 31 on stools 42, being appropriately apertured at 43 and 44 in order to receive mounting sleeve 34 and axle 40, respectively, therethrough, the aperture 44 for the latter being substantially enlarged for purposes to be described. To the floor plate 41 in turn is fixed a pair of upright stub axles 45 and 46 so that the film drive sleeve 39 and the stub axles 40, 45 and 46 together form the corners of a trapezoid with respect to the floor plate 41, the long side of the trapezoid being adjacent the open front face of the housing 31.

Stub axle 40 has suitably journaled thereon a film-metering roller 47 having an elastomeric frictional surface 48 and at its lower axial end a cam 49 extending through the aperture 44 to below the floor plate 41. Upon the cam 49 rides the switch arm 50 of a pair of ganged, d.p.d.t. microswitches, collectively identified as CS–3 and mounted beneath floor plate 41 in a suitable manner, the periphery of cam 49 being provided with a flat 49a thereon which operates CS–3 upon rotation of metering roller 47. When switch arm 50 of CS–3 is on the flat 49a, CS–3 is in the position shown in FIG. 6. A film idler roller 51 is suitably journaled on the stub axle 45 and has its periphery at its lower end provided with a groove 52 in which rides the switch operating arm 53 of a s.p.d.t. microswitch CS–4 such that when arm 53 is so riding in grooves 52, CS–4 is in its NC position (see FIG. 6). The electrical components of the film magazine assembly 30 are connected, as hereinafter described, into a 7 lead cable 54 passing through a sidewall of housing 31 and terminating in a male pin plug CP–2 connectable into the female plug CP–1 of the camera body assembly 10.

An L-shaped bracket 55 is fixed to floor plate 41 and has an upright portion carrying a spongelike film wiper 56 which bears against the surface 48 of film-metering roller 47. Across the forward edge of the floor plate 41, just inboard of the open front face of housing 31, is screwed an upright film back plate 57 by means of a lower flange 58 thereon, the plate 57 being somewhat larger than the area of each film exposure. To the forward open face of housing 31 is screwed a film plate 60 having a central rectangular aperture 61 the size of each film exposure. Plate 60 is generally coterminous at its ends with the front face of housing 31 but overhangs the upper and lower edges of the latter. The upper and lower margins of the aperture 61 as well as one end margin thereof are provided with forwardly facing rabbets 62 therein, the other end of plate 60 being recessed at 63 from its outer edge through to its adjacent end margin of aperture 61 to merge with the upper and lower rabbets 62, all in order to provide ways which slidably receive a removable dark slide 64 insertable from the latter edge of plate 60 for closing the aperture 61 therein, the slide 64 having a forward flange 65 on its outer end in order to enable it to be inserted and removed. The dark slide 64 is secured by a retainer plate 66 having an aperture therein congruent with aperture 61 and secured to the front face of plate 60. Retainer plate 66 is stopped short of the end of plate 60 remote from that in which dark slide 64 is inserted in order to provide a shoulder 67 which abuts the inner edge of a vertical groove 68 cut in the outer face of the film plate 60. A portion 69 of the outer end of retainer plate 66 forward of the recess 63 is cut away in order to receive the flange 65 of dark slide 64.

The inner flanges 12 of the rear open face of camera housing 11 are formed to provide a rear facing, rectangularly framed flat seat 70 of the same height as film plate 60 and inset from the rear face of housing 11, the rear edge of one sidewall of the latter also being cut down at 71 to merge with the seat 70, all in order to allow film magazine assembly 30 to be placed in position on the rear of camera housing 11. In that position the forward face of retainer plate 66 engages the seat 70 with the shoulder 67 of plate 66 abutting a shallow outer wall 72 formed at the rear edge of the other sidewall of housing 11 and received in the groove 68 of film plate 60 such that the aperture 61 is symmetrically disposed with respect to the axis of lens 14. The rear edges of the top and bottom walls of housing 11 are inwardly beveled at 73 and fitted with slidable lock bars 74, each having a pair of parallel slots 75 therein spaced along its outer edge and canted with respect thereto. The slots 75 receive headed screws and spring washers 76 threaded into the beveled faces 73. The inner edge of each lock bar 74, opposite the slots 75, is provided with a pair of locking lips 77 which move inwardly from the faces 73, owing to the canted slots 75, and tightly engage the upper and lower overhanging portions of the rear face of film plate 60 when lock bars 74 are slid longitudinally along the beveled faces 73. The film magazine assembly 30 is thus removably locked in position to the rear face of the camera assembly 10.

The open top of film magazine housing 31 is closed by a removable cover plate 78, its front edge fitting into a horizontal groove 79 in the rear face of film plate 60 and its remaining edges being flanged in order to fit over the side and rear walls of housing 31. Cover plate 78 is secured by a thumbscrew and knob 80 threaded into a boss 81 cast on the inner face of the rear wall of housing 31, thereby permitting access to the interior of housing 31 for inspection and for loading and unloading of film. As mentioned, the latter is a thin polyester base film and is wound on a spool 82 that rotates on stub axle 46. Each roll of film is 100 feet in length and 70 millimeters wide, a suitable type being that sold under the trademark KODAK ESTAR, and is .004 inches thick. The film passage is indicated in FIG. 5. As is apparent, of course, since lens 14 has a fixed focus, the depth of camera housing 11 must be such that the distance between the rear lens assembly 14b and the film against the film back plate 57 is correct for the depth of field employed. This distance can be calculated or can be readily determined by trial and error by those skilled in the art.

b. The Digital Readout Panel, the Trickle Charger and the Electrical Interconnections of the Camera System The control or digital readout panel is shown in FIG. 1 connected into a pair of cameras 1 and 2 and a trickle battery charger. The two cameras are identical and common reference numerals are used for both, except that the terminal board of camera 2 is designated CT-2. The digital readout panel includes a rectangular housing 100 with a sloped front panel 101 which mounts film counters C-1 and C-2 for cameras 1 and 2, respectively, above which are counter lamps DL-1 and DL-2. The top of housing 100 above DL-1 and DL-2 carries a pair of normally open s.p.s.t. push button test switches DS-1 and DS-2 for cameras 1 and 2 between which is a s.p.s.t. key switch DS-3. On panel 101 below DS-3 is a normally closed s.p.s.t. push button alarm reset switch DS-4 and below that an alarm lamp DL-3. Within the housing 100 is a suitable t.p.d.t. alarm relay R-1 (see FIG. 7).

The trickle charger is also enclosed in a similar housing 102 whose sloping front panel 103 carries at one side a fuse assembly F-1 and an s.p.s.t. power line switch TS-1, and on the other side, an indicator lamp TL-1. In the middle of panel 103 is a milliammeter MA, and one end of housing 102 mounts a female, 2-lead plug TP-1. Within housing 102 (see FIG. 8) are a suitable 110v. line transformer T-1, which reduces line voltage to 6vs., two pairs of half-wave diode rectifiers, D-1 and D-2, D-3 and D-4, and two ¼-watt resistors R-1 and R-2 of 470 and 10,000 ohms, respectively.

Figure 6:
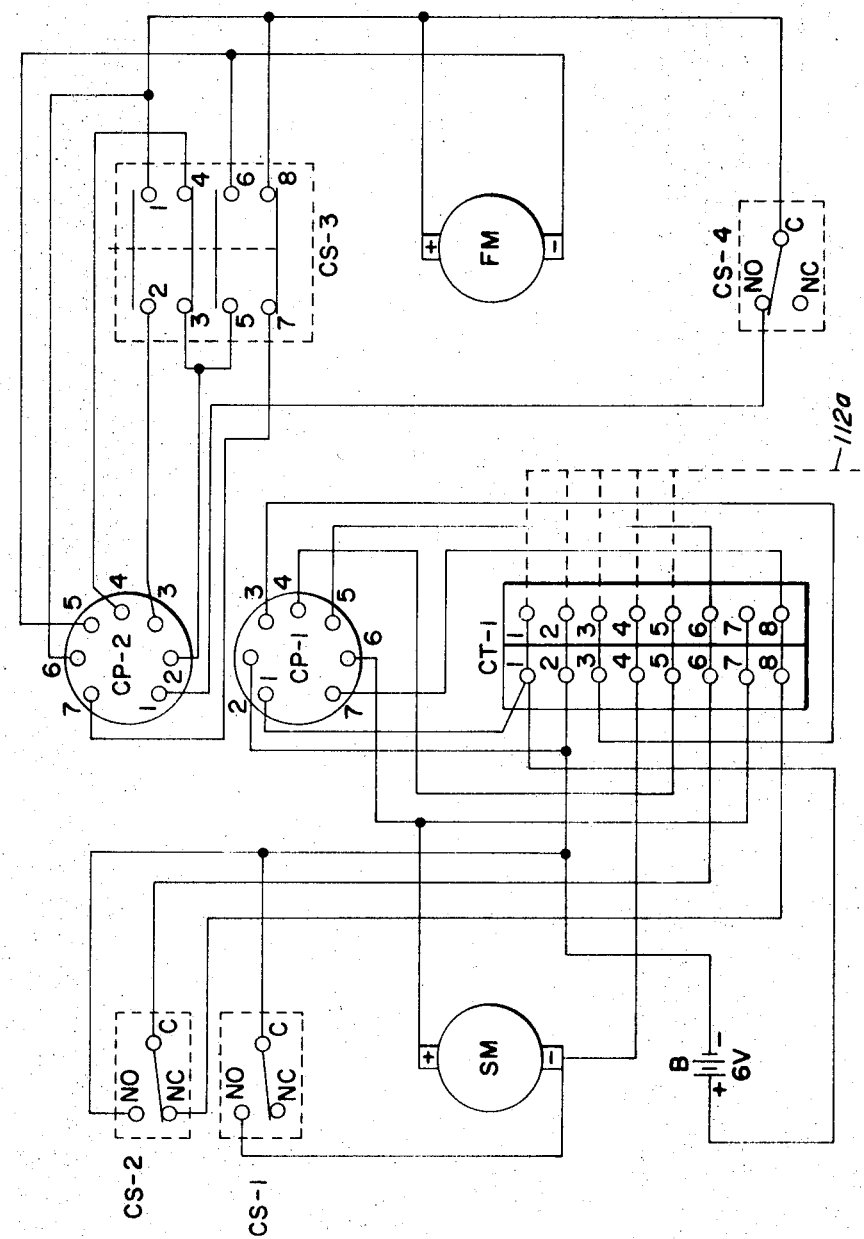
FIG. 6 is a schematic diagram of the electrical circuitry of each camera according to the present invention.
Figure 7:
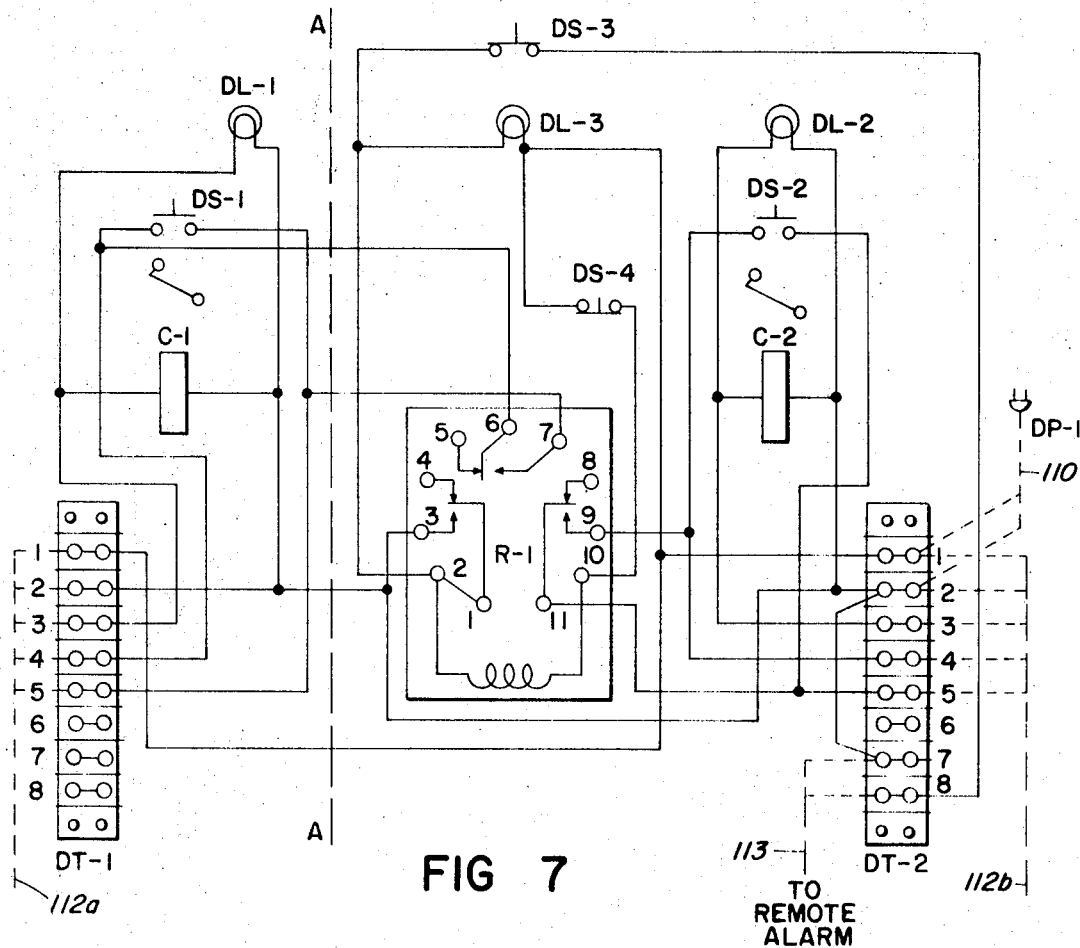
FIG. 7 is a schematic diagram of the electrical circuitry of the digital readout panel according to the present invention.
Figure 8:
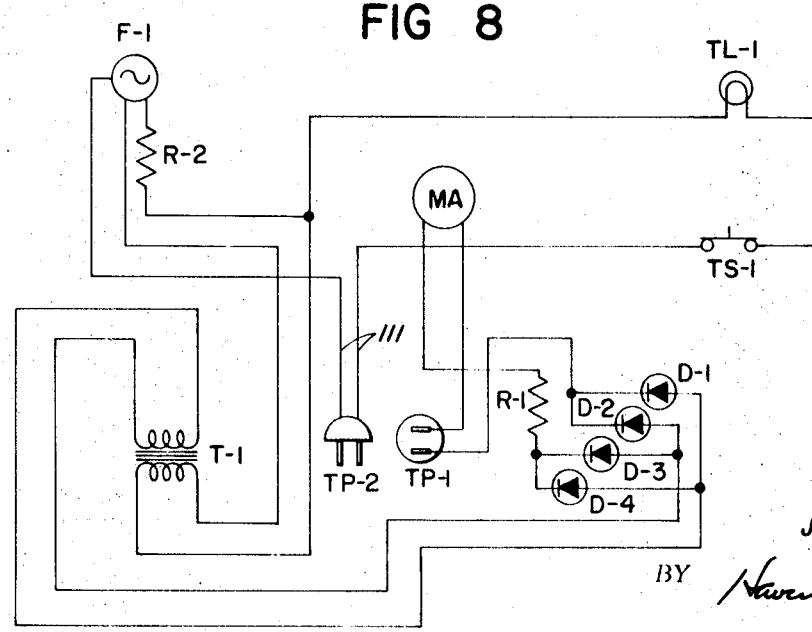
FIG. 8 is a schematic diagram of the electrical circuitry of the trickle charger employed to maintain the batteries in each camera.

The trickle charger is connected to the digital readout panel by means of a 2-lead cable 110 from the latter having a male plug DP-1 engaging the plug TP-1 of the trickle charger. The latter is connected into a suitable 110v. power source by a 2-lead cable 111 and a male plug TP-2. Cameras 1 and 2, in turn, are connected into the digital readout panel by means of two 5-lead cables 112a and 112b, while a 2-lead cable 113 connects the digital readout panel into the bank's alarm system and serves to activate both cameras in the manner hereinafter described.

c. The Internal Electrical Circuitry and Operation of the Sequence Camera System As mentioned, FIG. 1 illustrates a 2-camera system. The circuitry of each camera, the control or digital readout panel and the trickle charger are schematically shown in FIGS. 6—8, together with their interconnections as indicated in FIG. 1. FIGS. 6 and 7 show each camera and the digital readout panel in their unactivated status, but ready for operation, which in the case of each camera means that the switch arms 24a and 24b of CS-1 and CS-2 are both on the flat 25a of cam 19, CP-1 is connected to CP-2, the switch arm 50 of CS-3 is on the flat 49a of cam 49, and the film magazine assembly is loaded with film in the manner indicated in FIG. 5 so that the switch arm 53 of CS-4 is riding thereon as the film passes around the idler roller 51, whereupon CS-4 is in the NO position illustrated in FIG. 6. In the case of the digital readout panel, the relay R-1 is in its inactive position shown in FIG. 7, and the key switch DS-3 and the alarm reset switch DS-4 are both closed. When the remote alarm is activated, the following sequence ensues:

Terminals 7 and 8 of DT-2 are thereby connected through cable 113. As a result, power is supplied to activate relay R-1 as follows: from the positive side of each battery B to terminals 1 of each CT-1, thence through cables 112a and 112b to terminals 1 of DT-1 and DT-2, then through DS-4 to terminal 10 of R-1; and from the negative side of each battery B to terminal 2 of each CT-1, then through cables 112a and 112b to terminals 2 of DT-1 and DT-2, then from terminal 2 to terminal 7 of DT-2, then through cable 113 and the remote alarm to terminal 8 of DT-2, and finally from the latter through DS-3 to terminal 2 of R-1. Closing of R-1 activates a hold circuit therefor by connecting terminals 1, 2 and 3 of R-1 so that closure of the remote alarm is no longer needed for subsequent operation of the camera system. At the same time, the alarm relay light DL-3 is lighted owing to the fact, as will be observed from FIG. 7, that it is connected between terminals 2 and 10 of relay R-1. Closing of R-1 also connects terminals 6 and 7, 9 and 11 thereof, the first pair activating camera 1 and the second pair camera 2. Since the operation of both cameras is identical, only that of camera 1 will not be described.

Connecting terminals 6 and 7 of R-1 first activates shutter motor SM as follows: from the positive side of battery B to terminal 1 of CT-1, then to terminals 1 of CP-1 and CP-2, from the latter through CS-4 to terminals 6 of CP-1 and CP-2, an thence to the positive side of SM; and from the negative side of battery B to terminals 2 of CP-1 and PC-2, from the latter through contacts 3 and 4 of CS-3 to terminals 4 of CP-1 and PC-2, thence from the latter to terminal 5 of CT-1, through cable 112a to terminal 5 of DT-1, from the latter through terminals 6 and 7 of R-1 to terminal of DT-1, through cable 112a to terminal 4 of CT-1, and thence to the negative side of SM.

Rotation of cam 19 by SM causes CS-1 to move from its NC to its NO position, in order to establish a hold circuit for the negative side of SM for purposes to be later described, and thereafter causes CS-2 also to move from its NC to its NO position. Between activation of CS-1 and that of CS-2, the rotation of cam 19 is sufficient to trip the shutter 15 through its lever 16 and the pitman 17 and pitman arm 21, further rotation of pitman 17 after CS-2 is activated serving to reset the shutter 15. Activation of CS-2 starts FM, as follows: from the positive side of battery B to terminal 1 of CT-1, thence through terminals 1 of CP-1 and CP-2 and CS-4 to the positive side of FM; and from the negative side of battery B through the NO position of CS-2 to terminal 6 of CT-1, and finally through terminals 5 of CP-1 and CP-2 to the negative side of FM. The film thereby caused to wind onto film drive sleeve 39 in turn causes rotation of film metering roller 47 and hence cam 49 until CS-3 is activated. The latter has several results, as follows: closing of the contacts 1 and 2 of CS-3 activates the film counter C-1 and counter light DL-1 through a circuit established from the positive side of battery B to terminal 1 of CT-1, thence through terminals 1 of CP-1 and CP-2, then through CS-4 and contacts 1 and 2 of CS-3 to terminals 3 of CP-1 and CP-2, then to terminal 3 of CT-1, then through cable 112a to terminal 3 of DT-1 and finally to C-1 and DL-1 which, it will be observed, are in parallel with each other; and from the negative side of battery B to terminal 2 of CT-1, then through cable 112a to terminal 2 of DT-1, and finally therefrom to the other sides of C-1 and DL-1. Opening of the contacts 3 and 4 of CS-3 opens the original circuit, described above, to the negative side of SM, but SM remains activated owing to the aforementioned hold circuit therefor established through the NO position CS-1 directly from the negative side of battery B to the negative side of SM. Closing of contacts 5 and 6 of CS-3 forms a holding circuit for the negative side of FM for purposes to be described, and opening of contact 7 and 8 of CS-3 delays operation of a dynamic brake circuit for FM, which, as later described, is formed together with the NC position of CS-2.

Thereafter, both SM and FM continue to operate until SM has completed one revolution, during which shutter 25 has been tripped and then reset by pitman 17, and switch arms 24a and 24b of CS-1 and CS-2 again arrive on the flat 25a of cam 19, returning both switches to their NC positions. SM is thus deactivated since the holding circuit therefor through the NO position of CS-1 is broken and the original circuit through contacts 3 and 4 of CS-3 is still open. FM, however, continues to operate until metering roller 47 has made one revolution and switch arm 50 of CS-3 again arrives on the flat 49a of cam 49. The duration of operation of FM depends, therefore, on the diameter of metering roller 47, and this, in turn, must be such that in one revolution an amount of film has been moved across aperture 61 sufficient for the next exposure. When switch arm 50 of CS-3 reaches the flat 49a of cam 49, CS-3 is thus returned to its original position with the following consequences: the counter circuit to C-1 and DL-1 is broken by the openings of contacts 1 and 2 of CS-3; the original circuit from the negative side of battery B to the negative side of SM through contacts 3 and 4 of CS-3 is reestablished; the hold circuit for FM through contacts 5 and 6 of CS-3 is broken, thus deactivating FM since CS-2 is now in its original NC position, and a dynamic brake circuit to FM is established. The latter imposes a short across the windings of FM as follows: from the positive side of FM through contacts 7 and 8 of CS-3 to terminals 7 of CP-1 and CP-2, thence through terminal 8 of CT-1 and the NC position of CS-2 to terminal 6 of CT-1, and finally therefrom through terminals 5 of CP-1 and CP-2 to the negative side of FM. The latter is thus braked to an instant halt so that it will not carry an unnecessary amount of film past the aperture 61 nor will the film be in motion when SM is activated to begin the next sequence. This is important because SM is activated to begin the next sequence by tripping the shutter 15 the moment contacts 3 and 4 of CS-3 are reclosed, thus reestablishing the original circuit to the negative side of SM through terminals 6 and 7 of R-1 which continues activated owing to the hold circuit therefor through terminals 1 and 3 of R-1, all as described above. As will be observed, camera 2 will operate in exactly the same manner through CT-2, cable 112b and DT-2 owing to the connection of terminals 9 and 11 of R-1, as will C-2 and DL-2.

Both cameras, therefore, continue to operate until the film of each is exhausted. When that occurs, the switch arm 53 of CS-4 in each camera, after the tail of the film has left idler roller 51, will drop into its groove 52, thus moving CS-4 in each camera to its NC position. Opening of the latter will permanently open the circuit from the positive side of each battery B to the positive side of each pair of motors SM and FM, inasmuch as it will be observed from FIG. 6 that operation of both is dependent upon CS-4 being in its NO position. However, R-1 will continue activated owing to its hold circuit through its terminals 1 and 3. If it is desired to stop the automatic sequence operation of both cameras before their film is exhausted, it is only necessary to momentarily depress DS-4 which is in series with the positive side of the hold circuit of R-1 and thus will deactivate the same. Thereafter, the remote alarm must be activated in order again to begin automatic sequence operation. If it is desired to shut the system off entirely from the remote alarm, the key switch DS-3 may be opened which, it will be noted, is in series with the remote alarm circuit and thus will prevent activation ofR-1 thereby. When the system is idle, or even when the key switch DS-3 is open, the operation of each camera can be periodically checked by momentarily depressing test switch DS-1 or DS-2, as the case may be. Depressing DS-1, it will be observed from FIG. 7, connects terminals 4 and 5 of DT-1 and, through cable 112a, the same terminals of CT-1. Thus power is supplied from the negative side of battery B to terminals 2 of CP-1 and CP-2, thence through contacts 3 and 4 of CS-3 to terminals 4 of CP-1 and CP-2 to terminals 5 of CT-1, thence through the connection of that terminal to terminal 4 of CT-1 to the negative side of FM. This, it will be seen, has the same effect as the connection of terminals 6 and 7 of R-1 when activated. In other words, connecting terminals 4 and 5 of CT-1 or CT-2 will operate either camera, independently of R14 1, so long as the connection remains and so long as there is film in the camera so that CS-4 is in its NO position to maintain the positive sides of the circuits to SM and FM. This is because sequence operation of both SM and FM is governed solely by making or breaking the various circuits to their negative sides.

Momentarily depressing DS-1 will operate camera 1 through one cycle, taking one picture, the success (or failure) of its operation being indicated by the operation (or not) of C-1 and DL-1 on the digital readout panel. Holding DS-1 closed will cause the camera to continue to cycle until DS-1 is released or the film is exhausted. It is worth noting also that cutting of the remote alarm cable 113 will activate R-1, since it in effect connects terminals 7 and 8 of DT-2 and causes both cameras to operate.

From the foregoing, it will be apparent that the camera of the present invention may also be used apart from the overall system, that is, without the digital readout panel and the trickle charger, since it contains its own sequence-operating mechanism and its own power supply. Sequence operation of the camera so used is achieved, as noted above, merely by connecting two of its terminals, e.g., terminals 4 and 5 of CT-1 in FIG. 6. Similarly the digital readout panel is easily adaptable for use with but a single camera. Simply omitting the portion thereof shown to the left of the line A-A in FIG. 7 will permit it to operate a single camera, for example, camera 2 in FIG. 7, the terminals 6 and 7 of R-1 being then unused or a d.p.d.t. relay being employed instead.

The trickle charger is conventional in its wiring and no description beyond that given above and that disclosed in FIG. 8 is believed necessary. It will be observed that its charge is delivered through cable 110 to terminals 1 and 2 of DT-1 and DT-2, owing to their interconnection in the digital readout panel, and thence through cables 112a and 112b to terminals 1 and 2 of CT-1 and CT-2 to which the batteries B are directly connected. The trickle charger delivers a steady 1 to 2 milliamperes to the batteries B which, owing to their type, cannot be overcharged.

Though the invention has been described in the terms of a particular embodiment, being the best mode known of carrying it out, and detailed descriptive language has been used, it is not so limited. Instead, the following claims are to be read as encompassing all adaptations and modifications of the invention falling within the spirit and scope thereof.

I claim:

1. A sequence camera comprising: housing means including a photographic lens and shutter; a first electric motor operatively associated with said shutter effective upon activation to provide a plurality of successive activations of said shutter; film transport means including a second electric motor adapted to receive a wound roll of photographic film and effective upon activation of said second motor to unwind the film and pass the unwound portion thereof in a path past said lens in a plurality of successive predetermined transport movements, said film transport means providing a predetermined interval of rest for the unwound film portion between successive ones of said transport movements during each of said shutter activations effective to record a plurality of successive images upon the unwound film portion upon successive activations of said shutter during the respective successive intervals of rest of said transport means; and sequential operating means associated with said electric motors and said transport means effective when said camera is connected to a source of electrical energy to cause a plurality of repeated sequential operations of said camera, each of said sequential operations serially including activation of said first motor and said shutter during one of said film rest intervals, activation of said second motor to cause one of said transport movements, deactivation of said first motor, and deactivation of said second motor, said sequential operating means including first switch means in series with said first motor, said switch means being effective in its circuit closed position to activate said first motor to begin and maintain said sequential operation of said camera and in its circuit open position to deactivate said first motor and halt said sequential operation; second switch means operated by said first motor effective to activate said second motor to begin one of said transport movements after said first motor has activated said shutter during one of said rest intervals; third switch means operatively associated with said second motor effective, when said first switch means is in its circuit closed position, to deactivate said second motor and to activate said first motor at the end of said transport movement and the beginning of the successive one of said rest intervals; and brake means for braking said second motor upon deactivation thereof.

2. The device of claim 1 wherein said housing means comprises a camera housing carrying said lens and shutter and having said first motor disposed therein; and a film magazine housing removably attached to said camera housing, said film transport means being disposed in said film magazine housing, a portion of said sequential operating means being disposed within said camera housing and a portion thereof in said film magazine housing, and releasable connections between said portions whereby said film magazine housing may be removed as a unit from said camera housing.

3. The device of claim 2 wherein said film transport means includes a cylindrical metering roller, one face of the unwound film portion being engageable with the periphery of said roller to cause rotation thereof during each of said transport movements, rotation of said metering roller activating a portion of said sequential operating means effective to determine the duration of operation of said second motor.

4. The device of claim 3 wherein said electrical energy source is disposed within said camera housing and comprises a rechargeable battery.

5. The device of claim 3 wherein said film transport means includes a film takeup roll, said roll comprising a rotatable sleeve driven by said second motor, said sleeve enveloping said motor and being disposed coaxially with the shaft thereof.

6. The device of claim 1 wherein said second switch means includes: a first pair of contacts in parallel with said first switch means and in series with said source and first motor, said first pair of contacts being in circuit open position upon deactivation of said first motor and in circuit closed position after activation of said first motor; a second pair of contacts in parallel with said second motor, said second pair of contacts being in circuit closed position while said second motor is deactivated and in circuit open position while said first motor is activated after said shutter activation, said second pair of contacts constituting a portion of said brake means; and a third pair of contacts in series with said source and second motor, said third pair of contacts being in circuit open position while said first motor is deactivated and in circuit closed position while said first motor is activated after said shutter activation.

7. The device of claim 6 wherein said third switch means includes: a first pair of contacts in series with said source, said first switch means and said first motor, said first pair of contacts being in circuit closed position while said second motor is deactivated and in circuit open position while said second motor is activated; a second pair of contacts in parallel with said third pair of contacts of said second switch means and in series with said second motor, said second pair of contacts being in circuit open position while said second motor is deactivated and in circuit closed position while said second motor is activated; and a third pair of contacts in parallel with said second motor and in series with said second pair of contacts of said second switch means and constituting the remaining portion of said brake means, said third pair of contacts being in circuit closed position while said second motor is deactivated and in circuit open position while said second motor is activated after said shutter activation.

8. The device of claim 3 wherein said camera housing is provided with front and rear walls, said lens being of the extreme wide-angle type and mounted upon said front wall with its axis extending therethrough and through said read wall thereof; wherein said film magazine housing is provided with a front wall removably mounted to the rear wall of said camera housing, the axis of said lens also extending through the front wall of said film magazine housing; and wherein a film plate is disposed between a portion of said film path and said lens, said film plate having an aperture therein symmetrically disposed about and lying in a plane normal to the axis of said lens, said film path portion being disposed in a plane parallel to said aperture plane.

9. The device of claim 8 wherein said film-metering roller is disposed adjacent one end of said film plate aperture and a film idler roller is disposed adjacent the other end of said film aperture, said idler roller having a periphery engageable with one face of the unwound film portion, said film path portion lying between said metering and idler rollers, the direction of said film passage being from said metering to said idler roller.

10. The device of claim 9 wherein film switch means are disposed in series with both said first and second motors and said source, said film switch means being located adjacent said idler roller effective to cause the unwound film portion when engaged with said roller to maintain said switch means in its circuit closed position and when disengaged with said roller to maintain said switch means in its circuit open position and thereby deactivate both said first and second motors.

11. The device of claim 7 wherein said first switch means is disposed remote from said camera and includes relay means, said relay means having an activating circuit in series with and powered by said source effective when activated to maintain said first switch means in its closed position.

12. The device of claim 11 including a control housing containing said relay and fourth switch means remotely disposed from said camera and control housings in series with said relay-activating circuit effective in its closed position to activate said relay, said relay including a pair of contacts in series with said activating circuit and in parallel with said fourth switch means effective to maintain activation of said relay when said fourth switch means is in its open position.

13. The device of claim 12 wherein said control housing includes: fifth switch means in series with said relay-activating circuit and normally in closed circuit position, said fifth switch means being effective in its circuit open position to deactivate said relay-activating circuit when said fourth switch means is in its open position and thereby halt said sequential operation of said camera; and sixth switch means in parallel with said first switch means and normally in open circuit position, said sixth switch means being effective while in its circuit close position to activate said first motor and said sequential operation of said camera.

14. The device of claim 13 wherein said control housing includes film counter and film counter lamp circuits in parallel with each other and in series with said source, said film counter and film counter lamp circuits including a fourth pair of contacts in said third switch means in series with said source and said circuits, said pair of contacts being in circuit open position while said second motor is deactivated and in circuit closed position while said second motor is activated.